United States Patent Office 2,725,905
Patented Dec. 6, 1955

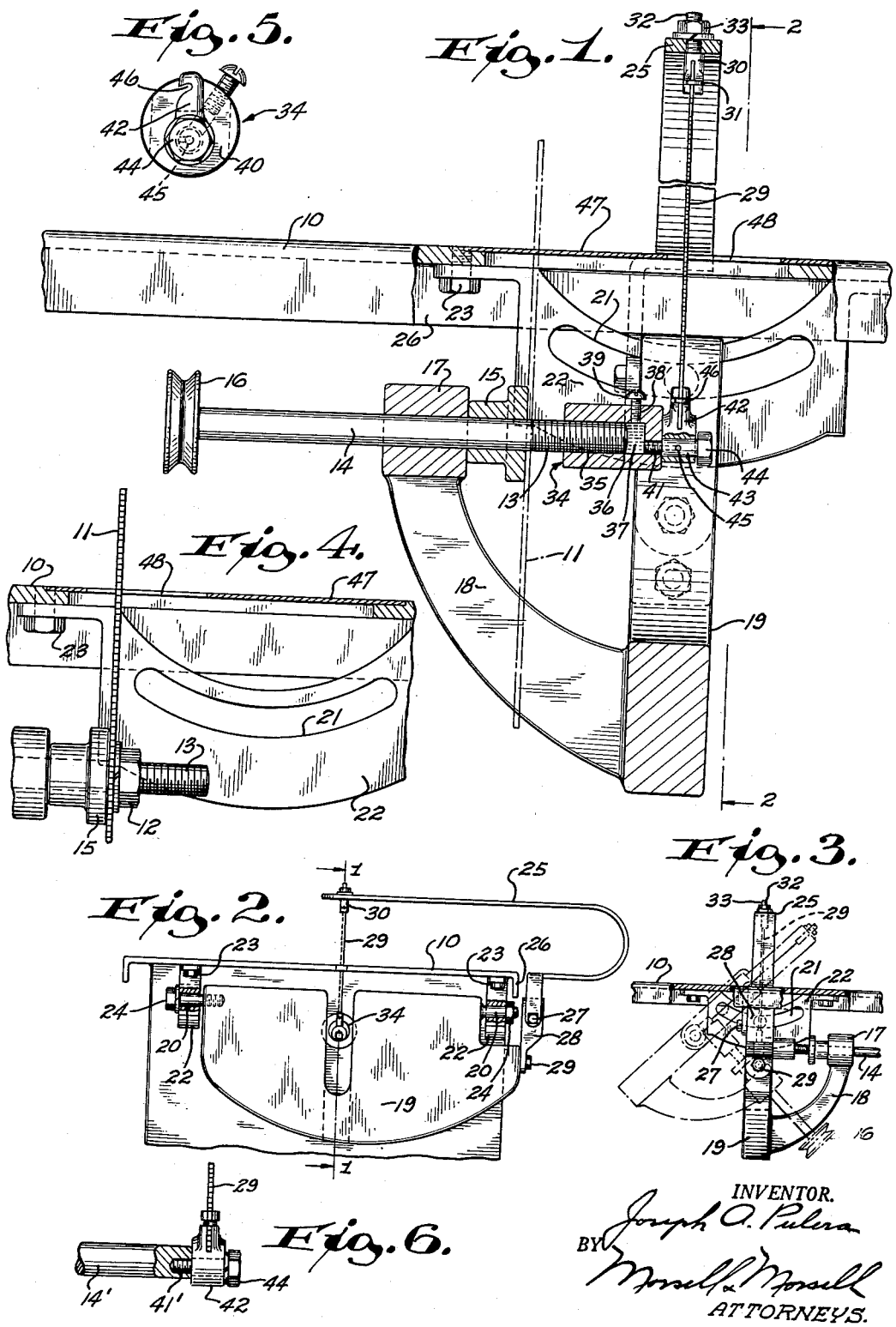

2,725,905

JIG SAWS FORMED FROM CIRCULAR-SAW TABLE SAWS

Joseph A. Pulera, Silverlake, Wis.

Application March 1, 1954, Serial No. 413,269

2 Claims. (Cl. 143—73)

This invention relates to improvements in jig saws and more particularly to attachments for converting a circular blade bench saw to a jig saw.

Most home craftsmen have circular blade bench saws but cannot afford to have a power driven jig saw in addition and it is a general object of the present invention to provide novel mechanism whereby a circular blade bench saw can be quickly converted to a power driven jig saw.

A further object of the invention is to provide a power driven jig saw construction wherein the lower end of the jig saw blade has a direct pull exerted thereon and is caused to reciprocate by means of an eccentric and crank. Thus, with the crank motion the blade is moved slightly away from the stock on the upstroke so that there is a minimum of drag.

A more specific object of the invention is to provide an improved jig saw attachment which includes a resilient supporting arm readily connectable to a bench saw for supporting the upper end of the jig saw blade, together with means connectable with the arbor of the bench saw for exerting a direct pull on the lower end of the saw blade, said pull causing reciprocation of the saw blade as a result of an eccentric crank type of connection with the arbor.

A further object of the invention is to provide mechanism as above described which may be readily adapted for use on tilting arbor bench saws whereby the conventional arbor adjustment can be used to adjust the jig saw blade to a selected angle with respect to the bench.

A further object of the invention is to provide a jig saw attachment which, while inexpensive, nevertheless does the equivalent work of a high priced power driven jig saw.

With the above and other objects in view, the invention consists of the improved jig saw, and all of its parts and combinations, as set forth in the claims, and all equivalents thereof.

In the accompanying drawings, illustrating one complete embodiment of the preferred form of the invention in which the same reference numerals designate the same parts in all of the views:

Fig. 1 is a fragmentary view, partially in front elevation and partially in vertical section taken approximately along the line 1—1 of Fig. 2, showing the improved jig saw attachment on a tilt arbor type of bench saw, the usual position of the conventional circular blade being indicated by dot and dash lines;

Fig. 2 is a fragmentary vertical sectional view taken approximately on the line 2—2 of Fig. 1;

Fig. 3 is a fragmentary rear elevational view looking at the rear of the jig saw of Fig. 2, the dot and dash lines indicating the arbor and jig saw in a tilted position;

Fig. 4 is a fragmentary vertical sectional view looking in the same direction as Fig. 1 and showing the slotted table insert in its normal position for cooperation with a circular saw;

Fig. 5 is an end view of the arbor adapter which is used in Fig. 1; and

Fig. 6 is a fragmentary front elevational view, partially in section, showing an arbor with a modified type of jig saw adapter.

Referring more particularly to the drawings, the numeral 10 designates the bench of a conventional type of bench saw which is normally adapted for use with a circular saw 11, shown in its conventional position in Fig. 4, and in dot and dash lines in Fig. 1. Said circular saw is usually held by a nut 12 on the threaded end 13 of an arbor 14 against a collar 15, the latter being rotatable with the arbor. The arbor is driven through the usual drive pulley 16 located on its outer end. In the usual tilting arbor type of bench saw the arbor is supported in a bearing 17 which is supported by the upper end of an arm 18. The lower end of the arm 18 is suitably connected with a mounting member 19, which mounting member has pivot bolts 20 which project through arcuate slots 21 in depending brackets 22. The brackets 22 are usually connected to the under side of the table in the manner shown in Figs. 1 and 2, by bolts 23. As a result of this arrangement, when the nuts 24 on the pivot bolts 20 are loosened, the mount 19 may be swung as is indicated by dot and dash lines in Fig. 3 to cause the arbor and saw supported thereby to tilt as is customary in tilt arbor saws.

In order to convert the conventional bench saw to a jig saw, the nut 12 and adjacent washer of Fig. 4, as well as the circular saw 11, are removed from the threaded end 13 of the arbor. In addition, the guard for the circular saw 11, if one is being used, must also be removed. The upper supporting arm 25 of the jig saw attachment, which arm has a U-shaped rear end, must then be secured in position. Where the saw is not a tilting arbor type, the lower portion of the arm 25 may be secured directly to the back flange 26 of the table 10. However, with a tilting arbor type of saw such as that illustrated, the lower end of the upper jig saw support 25 is rigidly connected by a bolt 27 to a bracket 28 projecting upwardly from the mounting member 19, the bracket being suitably connected to the mounting member as at 29. A member such as the member 28 is usually present in the tilting arbor type of bench saw for the support of the conventional saw guard, the latter also being connectable by the bolt 27.

The upper portion of the jig saw supporting arm 25 is somewhat flexible to provide for reciprocal movement of the jig saw blade 29. The forward end of the arm 25 carries a conventional type of holder 30 for an end of a jig saw blade, said holder having the usual transverse blade pin receiving slot 31, and having a threaded stem 32 which extends through a hole in the supporting arm and which is removably and adjustably fixed thereto by a nut 33.

The arbor adapter 34, which is an important feature of the present invention, is a generally cylindrical member having a threaded bore 35 for receiving the threaded end 13 of the arbor. The threading of the bore terminates at 36 but the bore continues beyond the end of the threading to provide a chamber 37 for lubricating oil. A filling opening 38 is normally closed by a screw or other plug 39. When the screw is removed, oil within the chamber 37 may be replenished.

The outer end of the arbor adapter 34 is closed as at 40 and is provided with an eccentric hole 41 which preferably extends through to communicate with the chamber 37. A lower jig saw blade holder 42 has a bearing opening 43 through which the unthreaded portion of a crank pin 44 extends. The inner end of the pin 44 is threaded to coact with the threaded eccentric hole 41 of the adapter 34. An L-shaped oil duct 45 in the crank pin 44 extends from the inner end of the pin where it is in communication with the oil in the chamber 37 to a side of the unthreaded portion of the crank pin, as shown in Fig. 1, to provide lubrication for the bearing 43. The saw blade holder 42 is provided with the usual notch 46 for coaction with the usual cross pin at the lower end of the jig saw blade 29.

If it is desired to construct a bench saw at the time of manufacture in such a way that it can be adapted for use with the jig saw attachment of the present invention, this can be accomplished as shown in Fig. 6, by forming the end of the arbor 14′ with an eccentric tapped opening 41′ which functions the same as the tapped opening 41 of the adapter 34 of Fig. 1. With the arrangement of Fig. 6 the crank pin 44 for the lower saw blade holder 42 is connected directly to the end of the arbor 14′ without the use of the cylindrical adapter 34. The cylindrical adapter 34, however, is needed to adapt bench saws already on the market which do not have an eccentric hole such as the hole 41′ in the end of the arbor. It is preferred to have the center of the hole 41, or the center of the hole 41′ about one-eighth of an inch off center.

With the above arrangement, when the arbor is driven at a rapid speed, there will be a crank action exerted on the lower end of the jig saw blade 29—that is, the eccentric position of the crank pin 44 will cause a rapid reciprocation while at the same time imparting limited rotary motion.

The arm 25, supporting the upper end of the saw blade 29 is capable of yielding just enough to permit the reciprocating motion while at the same time furnishing sufficient support for the upper end of the blade. It is apparent that the lower end of the blade is moved differently from the upper end. The limited rotary motion which is imparted to the lower end of the blade causes the jig saw to clear itself slightly on the upstroke so that there is a minimum of drag.

With the present invention it is apparent that the motion is transmitted by a direct pull on the lower end of the saw blade as distinguished from a conventional power driven jig saw where this is not the case.

With the present invention a bench saw can be converted in three or four minutes from a condition where the conventional circular saw 11 is being utilized to a condition where the jig saw is in operative position. When converting certain types of bench saws, a table opening for the jig saw can be brought about by merely reversing the slotted insert plate 47 to bring the slot 48 therein from the left side of the plate to the right hand side as in Fig. 1. When the opening 48 is on the left hand side of the plate 47 it is usually in a position to receive the projecting portion of the conventional circular saw 11. In cases where this does not work out a special opening can be easily drilled in the insert plate 47 for the jig saw blade 29.

It is apparent that all that is needed to convert a standard bench saw to a power jig saw is the arm member 25 together with the adapter of Fig. 5 or the adapter of Fig. 6. Obviously, these parts can be sold for a relatively small sum.

Various changes and modifications may be made without departing from the spirit of the invention, and all of such changes are contemplated, as may come within the scope of the claims.

What I claim is:

1. A jig saw attachment for a circular blade bench saw of the type having a rotatable arbor comprising an upper support having one end connectible to the bench saw and having a reciprocably movable yieldable portion, a jig saw blade of the type having cross pins near its ends, said blade having its upper end detachably connected to said reciprocably movable portion, a circular blade holder having a peripheral projection with slotted means detachably engaging the cross pin at the lower end of said jig saw blade directly, said blade holder having a bearing hole, eccentric means journalled in the bearing hole of the blade holder, and means for readily removably and rigidly connecting said eccentric means to the arbor so that it will cause vertical reciprocating movement of the jig saw blade when the arbor is rotated, said direct connection of the lower end of the blade to the holder on the arbor causing oscillatory movement of the blade as it reciprocates.

2. A jig saw attachment for a circular blade bench saw of the type having a rotatable arbor with a threaded end comprising an upper support having one end connectible to the bench saw and having a reciprocably movable yieldable portion, a jig saw blade, said blade having its upper end detachably connected to said reciprocably movable portion, a circular blade holder having a peripheral projection with connection means detachably engaging the lower end of said jig saw blade directly, said blade holder having a bearing hole, eccentric means journalled in the bearing hole of the blade holder, and means cooperable with said threaded end of the arbor for readily removably and rigidly connecting said eccentric means to the arbor so that it will cause vertical reciprocating movement of the jig saw blade when the arbor is rotated, said direct connection of the lower end of the blade to the holder on the arbor causing oscillatory movement of the blade as it reciprocates.

References Cited in the file of this patent

UNITED STATES PATENTS

| Re. 19,501 | Combs | Mar. 19, 1935 |
| 212,355 | Cary | Feb. 18, 1879 |
| 769,432 | Chinn | Sept. 6, 1904 |
| 1,826,983 | Beebe | Oct. 13, 1931 |
| 2,609,015 | Gaviola et al. | Sept. 2, 1952 |
| 2,652,823 | Grabinski | Sept. 22, 1953 |
| 2,660,206 | Beebe | Nov. 24, 1953 |